Aug. 20, 1940.  W. A. NELSON  2,212,166

TIRE AND WHEEL PROTECTOR

Filed July 21, 1938  2 Sheets-Sheet 1

Inventor

W. A. Nelson

By Clarence A. O'Brien
and Hyman Berman
Attorneys

Aug. 20, 1940.  W. A. NELSON  2,212,166
TIRE AND WHEEL PROTECTOR
Filed July 21, 1938  2 Sheets-Sheet 2
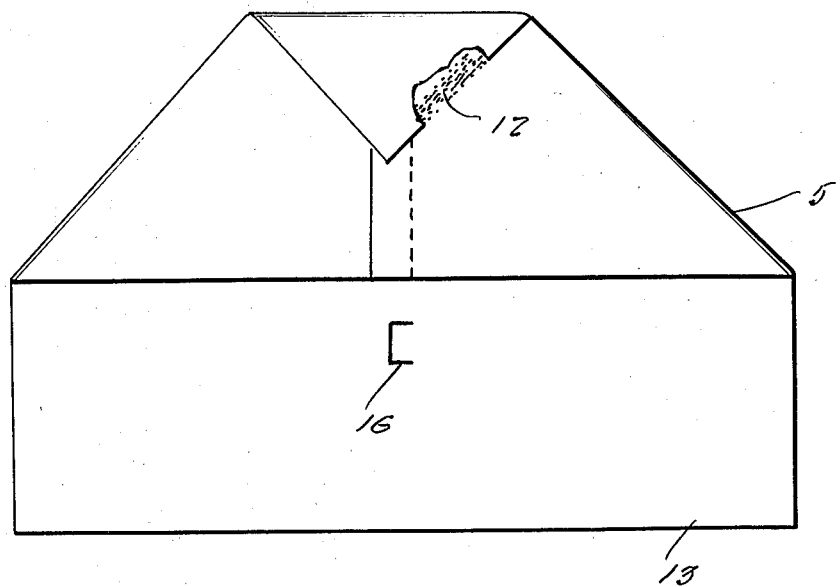
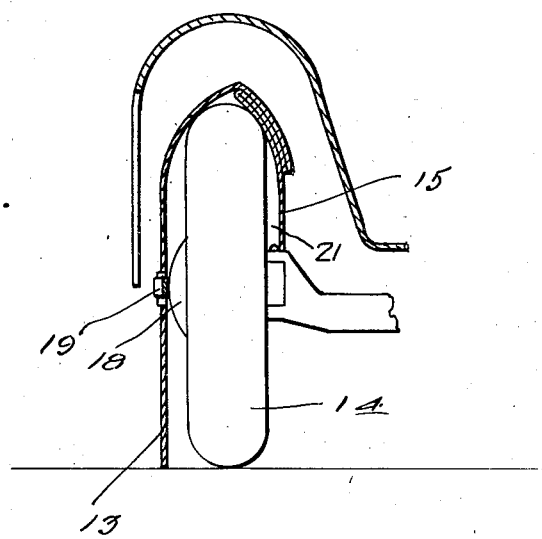
Inventor
W. A. Nelson
By Clarence A. O'Brien
and Hyman Berman
Attorneys Patented Aug. 20, 1940

2,212,166

UNITED STATES PATENT OFFICE 2,212,166

TIRE AND WHEEL PROTECTOR

William A. Nelson, Detroit, Mich.

Application July 21, 1938, Serial No. 220,549

4 Claims. (Cl. 91—65)

The present invention relates to protecting devices for automobile tires and wheels while painting the fenders or other parts of the automobile and has for its primary object to provide an envelope adapted to enclose and cover the tire as well as the outer surface of the wheel to protect the same while the remainder of the automobile is being painted.

A further object is to provide an article of this character of simple and practical construction, which is efficient and reliable when in use, relatively inexpensive to manufacture, which is easy to install and remove from position on the wheel and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout, and in which Figure 1 is a side elevational view showing the protector in position on the wheel of an automobile.

Figure 2 is a transverse sectional view.

Figure 3 is a side elevational view of the inner side of the envelope, and

Figure 1:
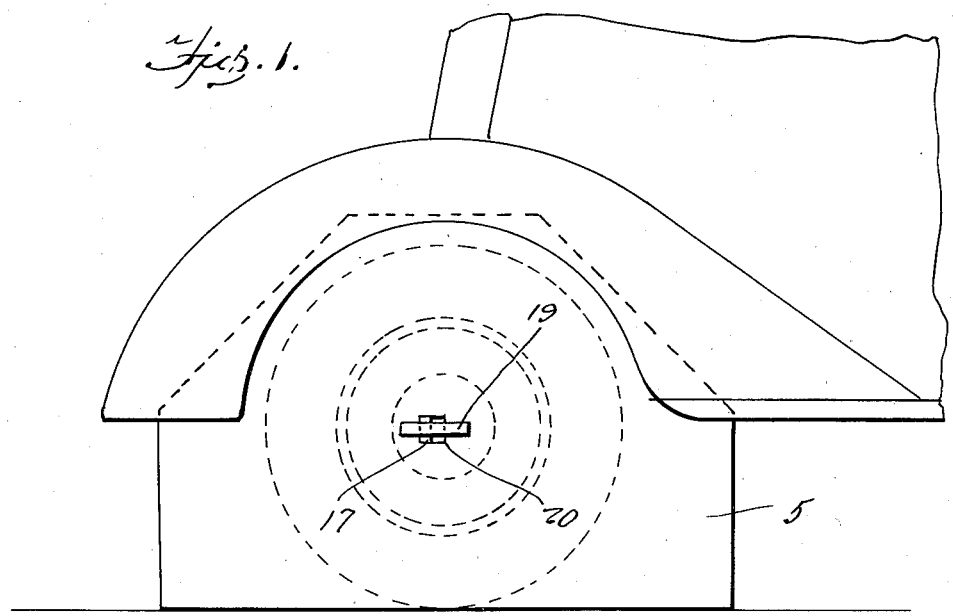
Figure 4:
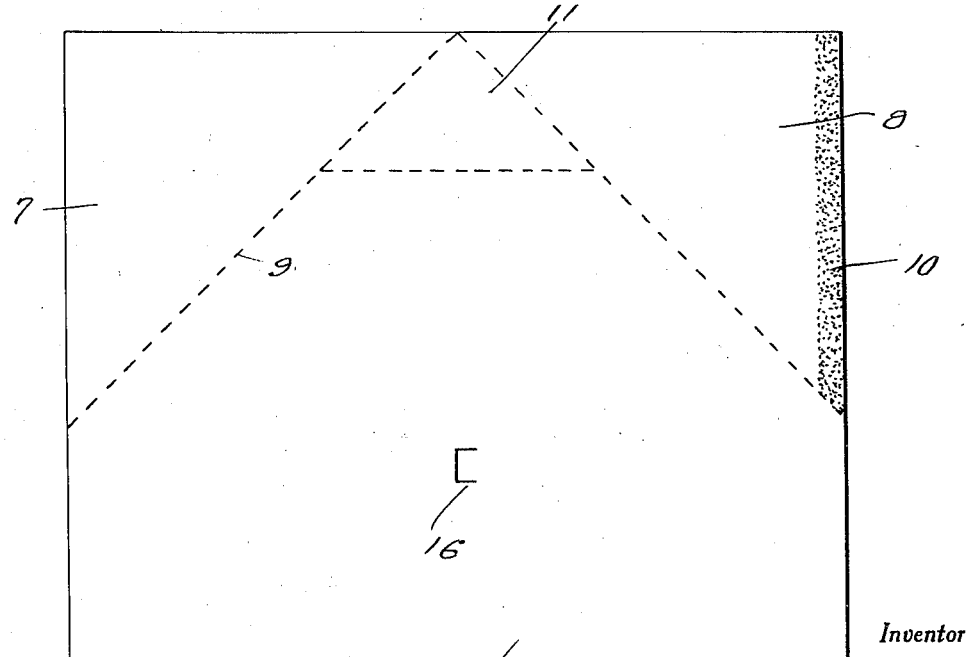
Figure 4 is a plan view of the blank from which the envelope is formed.

Referring now to the drawings in detail, the invention comprises an envelope designated generally at 5 and formed of a blank sheet 6, preferably of medium weight paper, such as wrapping paper or the like and having two of its corners indicated at 7 and 8 folded inwardly upon diagonal lines 9 and secured at their inner folded edges in overlapping relation by glue or similar adhesive 10 placed along one edge of one of the folded portions. The top portion 11, after the folding of the corners 7 and 8, is then folded downwardly against the folded corners and likewise secured in position by an adhesive 12, thus forming a pocket 21.

When folded in the manner explained above, the envelope is provided with an extension 13 along its open edge so that when the envelope is placed in position upon a vehicle wheel 14 the extension 13 will be positioned on the outside of the wheel and terminate at a point adjacent the ground, whereas the rear of the envelope, indicated at 15 in Figure 2 of the drawings will cover only the upper portion of the wheel.

The extension 13 is provided with a U-shaped slit 16 to form a flap 17 which, when opened, in the manner shown in Figure 1 of the drawings, exposes a portion of the hub cap 18 of the wheel and a strip of adhesive tape 19 is positioned transversely of the opening 20, thus formed in the envelope so that the tape will contact the hub as well as the outer surface of the envelope and thus secure the envelope in position on the wheel.

If desired, the envelope may be treated with a waterproof coating to render the same impervious to moisture during the painting or cleaning of the automobile on which the same is used.

It is believed the details of construction and manner of use of the device will be readily understood from the foregoing without further detailed explanation.

Having thus described the invention, what I claim is—

1. A protector for vehicle wheels comprising a rectangular sheet of flexible material folded along one edge to form an envelope adapted to accommodate a vehicle wheel, said envelope including an outer surface adapted to entirely cover a vehicle wheel and with its lower edge parallel to and resting on the ground and means for securing the envelope to the wheel.

2. A protector for vehicle wheels comprising a rectangular sheet of flexible material folded along one edge to form an envelope and embodying a pocket for receiving the upper portion of the wheel one edge of the envelope being parallel to and resting on the ground and means for securing the envelope to the wheel.

3. A protector for vehicle wheels comprising a rectangular sheet of flexible material folded along one edge to form an envelope embodying a pocket for receiving the upper portion of the wheel, said envelope at its outer surface having an opening therein and an adhesive strip secured to the envelope and extending transversely of the opening for contacting a portion of the wheel for securing the envelope thereto.

4. A protector for vehicle wheels comprising a rectangular sheet of flexible material folded along one edge and adhesively secured to form an envelope adapted to accommodate the top of the wheel, one side of the envelope having a short edge adapted to rest upon the axle of the wheel and the other side of the envelope adapted to cover the outer surface of the wheel with its bottom edge resting upon the ground and means for adhesively attaching the envelope to the wheel.

WILLIAM A. NELSON.